(12) United States Patent
Hwang et al.

(10) Patent No.: US 11,312,269 B2
(45) Date of Patent: Apr. 26, 2022

(54) AUTONOMOUS VEHICLES AND METHOD OF ROTATING SEATS OF AUTONOMOUS VEHICLES

(71) Applicants: Hyundai Motor Company, Seoul (KR); Kia Motors Corporation, Seoul (KR)

(72) Inventors: Jin Ho Hwang, Seoul (KR); Dong Eun Cha, Hwaseong-si (KR); Sang Heon Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 170 days.

(21) Appl. No.: 16/815,243

(22) Filed: Mar. 11, 2020

(65) Prior Publication Data

US 2021/0078455 A1 Mar. 18, 2021

(30) Foreign Application Priority Data

Sep. 16, 2019 (KR) .......................... 10-2019-0113496

(51) Int. Cl.
*B60N 2/14* (2006.01)
*B60N 2/75* (2018.01)
(Continued)

(52) U.S. Cl.
CPC .............. *B60N 2/14* (2013.01); *B60N 2/015* (2013.01); *B60N 2/773* (2018.02); *B60N 2/793* (2018.02); *B60N 3/001* (2013.01)

(58) Field of Classification Search
CPC .......... B60N 2/14; B60N 2/773; B60N 2/015; B60N 3/001; B60N 2/793; B60N 2/797;
(Continued)

(56) References Cited

U.S. PATENT DOCUMENTS 5,611,589 A * 3/1997 Fujii ........................ B60N 2/01
296/64
6,135,529 A * 10/2000 De Angelis ............... B60R 7/04
296/37.8
(Continued)

FOREIGN PATENT DOCUMENTS

CN 109922989 A 6/2019
JP H09-109778 4/1997
(Continued)

*Primary Examiner* — Pinel E Romain
(74) *Attorney, Agent, or Firm* — Morgan, Lewis & Bockius LLP

(57) ABSTRACT

An autonomous vehicle may include a plurality of seats rotatably provided on a vehicle floor of the vehicle; a console device rail provided between the plurality of seats and extending in a longitudinal direction thereof; and a console device mounted on the console device rail and configured for sliding between the plurality of seats along the console device rail, the console device mounted on the console device rail via a rotation shaft to be rotatable about the rotation shaft relative to the console device rail, wherein when the console device is slid along and rotated relative to the console device rail during rotation of the seat, the interference by the seats and the console device is prevented.

22 Claims, 11 Drawing Sheets

(51) Int. Cl.
  *B60N 2/015* (2006.01)
  *B60N 3/00* (2006.01)
(58) Field of Classification Search
  CPC .......... B60N 2/763; B60N 2/01; B60N 3/002;
       B60N 2/143; B60R 7/04; B60R 16/03;
       E05B 83/32
  USPC .......................................................... 296/37.8
  See application file for complete search history.

(56) References Cited

U.S. PATENT DOCUMENTS

| | | | | |
|---|---|---|---|---|
| 6,752,444 B2* | 6/2004 | Kitano | ................ | B60R 7/04 |
| | | | | 296/184.1 |
| 7,152,897 B2* | 12/2006 | Bonnes | ................ | B60N 2/072 |
| | | | | 296/35.1 |
| 7,186,118 B2* | 3/2007 | Hansen | ................ | B60R 7/04 |
| | | | | 296/24.34 |
| 7,416,235 B2* | 8/2008 | Rajappa | ................ | B60R 7/04 |
| | | | | 296/24.34 |
| 7,520,552 B2* | 4/2009 | Nakamura | ................ | B60R 7/04 |
| | | | | 108/44 |
| 7,591,498 B2* | 9/2009 | Busha | ................ | B60N 3/101 |
| | | | | 296/24.34 |
| 8,002,323 B2* | 8/2011 | Jones | ................ | B60R 7/04 |
| | | | | 296/37.1 |
| 9,597,983 B2* | 3/2017 | Strasdat | ................ | B60N 2/067 |
| 10,259,347 B2* | 4/2019 | Kim | ................ | B60N 2/14 |
| 10,661,717 B2* | 5/2020 | Lee | ................ | B60R 7/04 |
| 10,717,374 B2* | 7/2020 | Kim | ................ | B60N 2/015 |
| 10,814,746 B2* | 10/2020 | Sailer | ................ | B60N 2/012 |
| 10,946,802 B2* | 3/2021 | Harris | ................ | B60R 7/04 |
| 11,007,916 B2* | 5/2021 | Schlierf | ................ | B60N 3/002 |
| 2004/0026947 A1* | 2/2004 | Kitano | ................ | B60R 11/0211 |
| | | | | 296/24.34 |
| 2007/0075107 A1* | 4/2007 | Brancheriau | ................ | B60N 2/773 |
| | | | | 224/281 |
| 2016/0152163 A1 | 6/2016 | Strasdat | | |
| 2019/0001841 A1* | 1/2019 | Vanel | ................ | B60N 2/065 |
| 2019/0315281 A1* | 10/2019 | Lee | ................ | B60R 7/04 |
| 2020/0223329 A1* | 7/2020 | Dry | ................ | B60N 2/0735 |
| 2020/0406787 A1* | 12/2020 | Line | ................ | B60N 2/0732 |

FOREIGN PATENT DOCUMENTS

| | | | | |
|---|---|---|---|---|
| KR | 1998-050937 U | 10/1998 | | |
| KR | 10-0586179 B1 | 5/2006 | | |
| KR | 10-2018-0042632 | 4/2018 | | |
| WO | WO01-83266 | 4/2000 | | |
| WO | WO-2018041289 A1 * | 3/2018 | ............ | B60N 2/005 |

* cited by examiner

100(110,120)
300(340,350)

AUTONOMOUS VEHICLES AND METHOD OF ROTATING SEATS OF AUTONOMOUS VEHICLES

CROSS REFERENCE TO RELATED APPLICATION

The present application claims priority to Korean Patent Application No. 10-2019-0113496, filed Sep. 16, 2019, the entire contents of which is incorporated herein for all purposes by this reference.

BACKGROUND OF THE INVENTION

Field of the Invention

The present invention relates to an autonomous vehicle and a method of rotating a seat of an autonomous vehicle, and more particularly, to an autonomous vehicle in which a seat can be rotated without interference by passengers and console devices and a method of rotating the seat of the autonomous vehicle.

Description of Related Art

Conventional vehicles have a driver's seat and a passenger's seat at the front side of the vehicle, a steering wheel operated by a driver at the front side of the driver's seat, a console device provided between the driver's seat and the passenger's seat, a shift lever at the front side of the console device, and a console box provided at the rear side of the console device for storing an object or the like.

Recently, research and development of autonomous vehicles that do not need to be driven directly by a driver are being actively conducted, and governments of many countries are also planning to build a road infrastructure for autonomous vehicles to commercialize autonomous vehicles.

When such autonomous vehicles are commercialized, the driver's seat and the passenger's seat do not need to be fixed facing forward at all times, while the driver's seat and the passenger's seat may be provided to be rotatable toward the rear side such that passengers in the drivers and passenger's seats can freely talk or enjoy leisure activities with the passengers in the rear seats.

However, in the case where the console device is integrally installed as general, when the drivers seat and the passenger's seat are rotated, the rotation is limited due to the interference by the passenger's foot and the console device, requiring a suitable internal design for an autonomous vehicle.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an autonomous vehicle in which seats may be easily rotated without interference by passengers and a console device by easily changing the position of the console device in consideration of changes in various vehicle seats which may occur during autonomous driving, and a method of rotating a seat of an autonomous vehicle.

In various aspects of the present invention, the present invention is directed to providing an autonomous vehicle including: a plurality of seats rotatably provided on a vehicle floor of the vehicle; a console device rail provided between the plurality of seats and extending in a longitudinal direction thereof; and a console device mounted on the console device rail and configured for sliding between the plurality of seats along the console device rail, the console device mounted on the console device rail via a rotation shaft to be rotatable about the rotation shaft relative to the console device rail, wherein when the console device is slid along and rotated relative to the console device rail during rotation of the seat, the interference by the seats and the console device is prevented.

The console device may include: a console body having an accommodation space; and a console body moving portion connected to the console body to fix or rotate the console body, a lower surface of the console body moving portion being accommodated on an upper surface of the console device rail and slid along the console device rail to move the console body.

The console device rail may include an extension extending upwards from an upper surface thereof and a protrusion protruding from an end portion of the extension, and the console body moving portion may be provided with a groove into which the protrusion of the console device rail is inserted, wherein the lower surface of the console body moving portion is accommodated on the upper surface of the console device rail such that the protrusion of the console device rail is caught in the groove formed in the console body moving portion, so that the console body moving portion is configured to be slid without being derailed from the console device rail.

The autonomous vehicle may further include a power supply supplying power to the console device.

The console body moving portion may include a magnetic body, a coil wound around an external circumferential surface thereof; and a power inlet provided at a lower end portion of the console body moving portion, wherein when the power is input to the power inlet, the console body moving portion is magnetized by the coil to be fixed to the console device rail.

When the power to the power inlet is shut off the console body moving portion may lose its magnetism to release the fixation to the console device rail so that the console device slides along and rotates relative to the console device rail.

The console device may include a console body having an accommodation space; a rotating portion connected to the console body to rotate the console body; and a console body moving portion positioned below and connected to the rotating portion to allow the console device to slide without being derailed from the console device rail.

The autonomous vehicle may further include a motor located inside the console device rail and connected to the console body moving portion and a wheel provided on an upper surface of the console device rail, wherein when the wheel slides along the console device rail as the motor is driven, the console device slides along the console device rail.

The console device rail may include an extension extending upwards from the upper surface thereof and a protrusion protruding from an end portion of the extension, and the console body moving portion may be provided with a groove into which the protrusion of the console device rail is inserted, wherein the protrusion of the console device rail is caught by the groove formed in the console body moving portion, so that when the wheel is moved along the console device rail as the motor is driven, the console device is configured to slide without being derailed from the console device rail.

The console device may include a first console device and a second console device, wherein the first console device is provided on the outside thereof with a first coupling portion for coupling with the second console device, and the second console device is provided on the outside thereof with a second coupling portion for coupling with the first coupling portion.

The first coupling portion and the second coupling portion may be tapered at portions that are abutted against each other when coupled together.

The first coupling portion may include a magnetic body, a coil wound around an external circumferential surface thereof, and a sensor configured to measure a distance from the second console device to the first coupling portion.

The autonomous vehicle may further include a controller configured to determine whether to supply the power to the first coupling portion depending on the distance between the first coupling portion and the second coupling portion.

The controller may be configured to, when the distance between the first coupling portion and the second coupling portion is less than or equal to a predetermined distance, supply power to the first coupling portion to magnetize the first coupling portion to be coupled to the second coupling portion.

The controller may be configured to, when the distance between the first coupling portion and the second coupling portion are more than a predetermined distance, stop the supply of power to the motor to stop the console device from moving along the console device rail.

The first coupling portion and the second coupling portion may be internally provided with a first data connection portion and a second data connection portion, wherein when the first coupling portion and the second coupling portion are coupled to each other, the first data connection portion and the second data connection portion are connected to each other so that power or a data signal may be transmitted between the first console device and the second console device.

The console device may further include: a cover located above a console body; and a table accommodated between the console body and the cover, wherein the console body is provided on the upper surface thereof with a hinge to enable the table to rotate.

The table may include an upper table and a lower table, wherein the lower table is configured to slide to overlap a lower side of the upper table, and then is rotated through the hinge to be accommodated in the accommodation space between the console body and the cover.

According to another aspect, various aspects of the present invention are directed to providing a method of rotating a seat in an autonomous vehicle, the method including: determining whether to rotate a seat; when the rotation of the seat is determined, sliding a console device along a console device rail and rotating the console device at a predetermined angle relative to the console device rail; rotating the seat; and returning the console device to its original position by sliding and rotating the console device.

The determining whether to rotate the seat may include determining whether the seat to be rotated is a driver's seat or a passenger's seat; when the seat to be rotated is the driver's seat, determining whether a vehicle is stopped or parked; and only when the vehicle is stopped or parked, allowing the seat to be rotatable.

According to an exemplary embodiment of the present invention, seats may be easily rotated without interference by passengers and a console device by easily changing the position of the console device in consideration of changes in various vehicle seats which may occur during autonomous driving.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
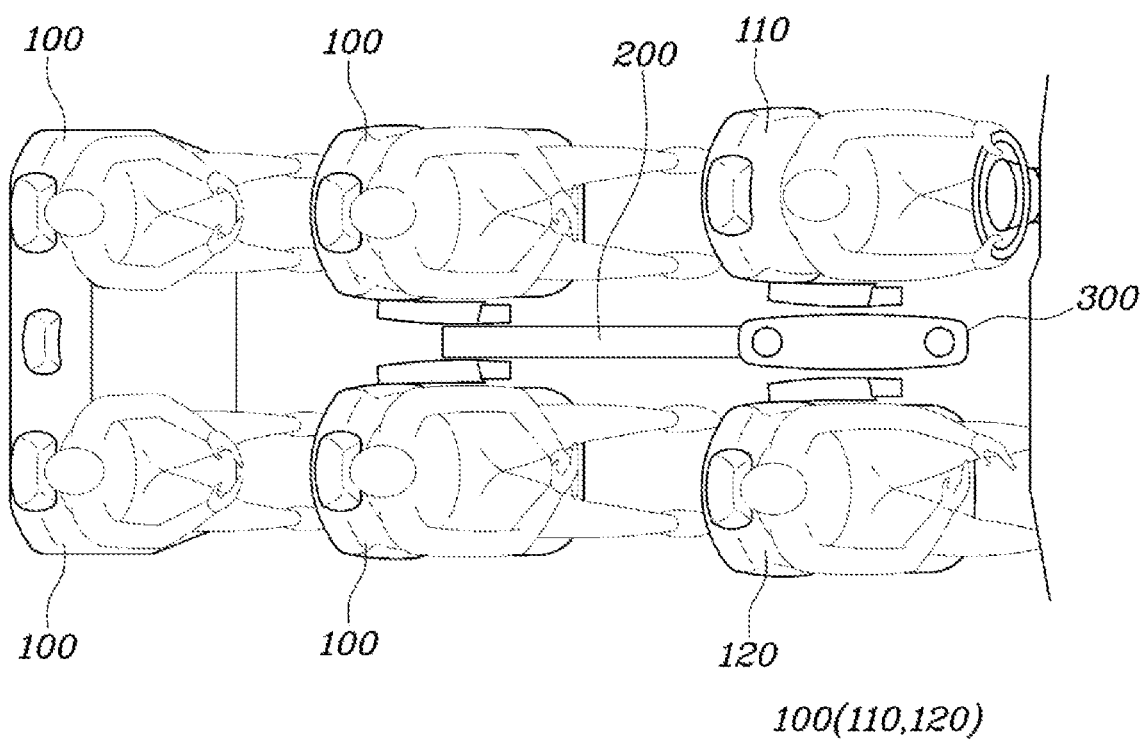
FIG. 1 is a view exemplarily illustrating an interior of an autonomous vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, exemplary embodiments of the present invention will be described in detail with reference to the accompanying drawings. The terms or words used in the exemplary embodiment and claims are not to be construed as being limited to their ordinary or dictionary meanings, and the inventors may interpret the terms or words as having a meaning and concept corresponding to the technical idea of the present invention based on the principle that the inventors may appropriately define the concept of terms to best describe their invention.

Therefore, embodiments described in the specification and the configuration described in the drawings are only the most exemplary embodiments of the present invention, and do not represent all of the technical idea of the present invention. Thus, it may be understood that there may be various equivalent modifications which may be replaced at the time when the present invention is filed.

Hereinafter, an autonomous vehicle and a method of rotating a seat of the autonomous vehicle will be described in detail with reference to the accompanying drawings.

Figure 2:
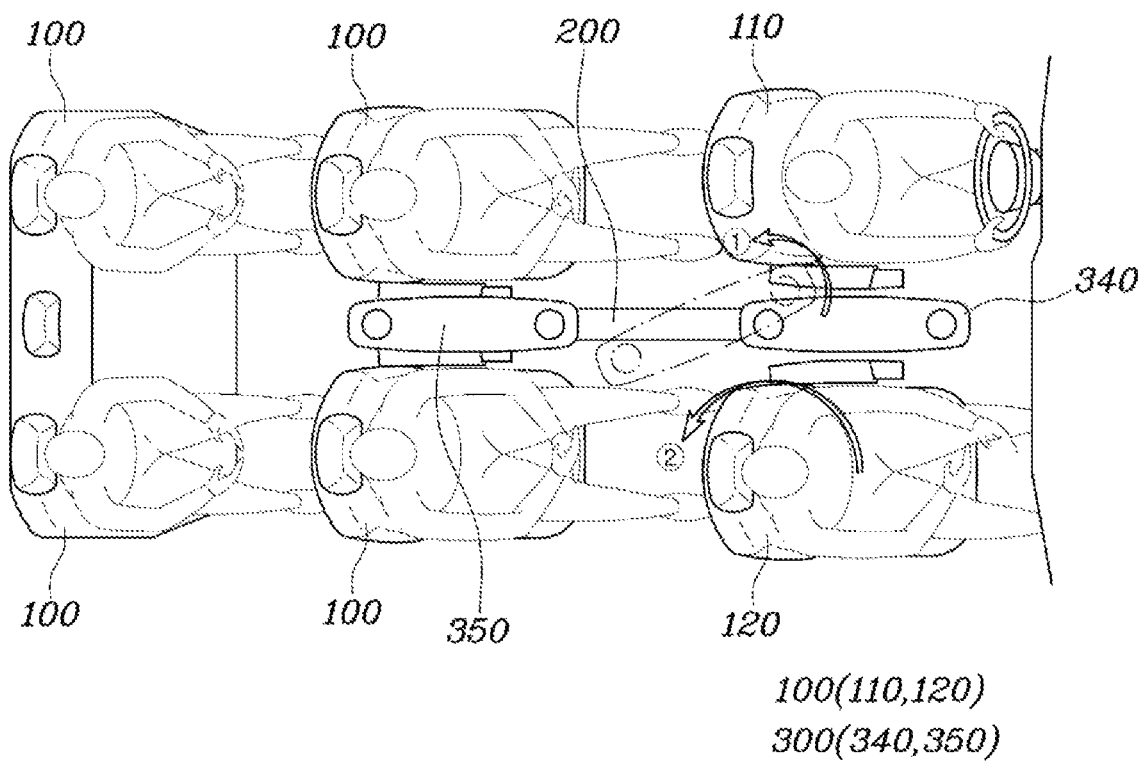
FIG. 2 is a view exemplarily illustrating a state in which a passenger's seat is rotatable in the autonomous vehicle according to an exemplary embodiment of the present invention.
Figure 3:
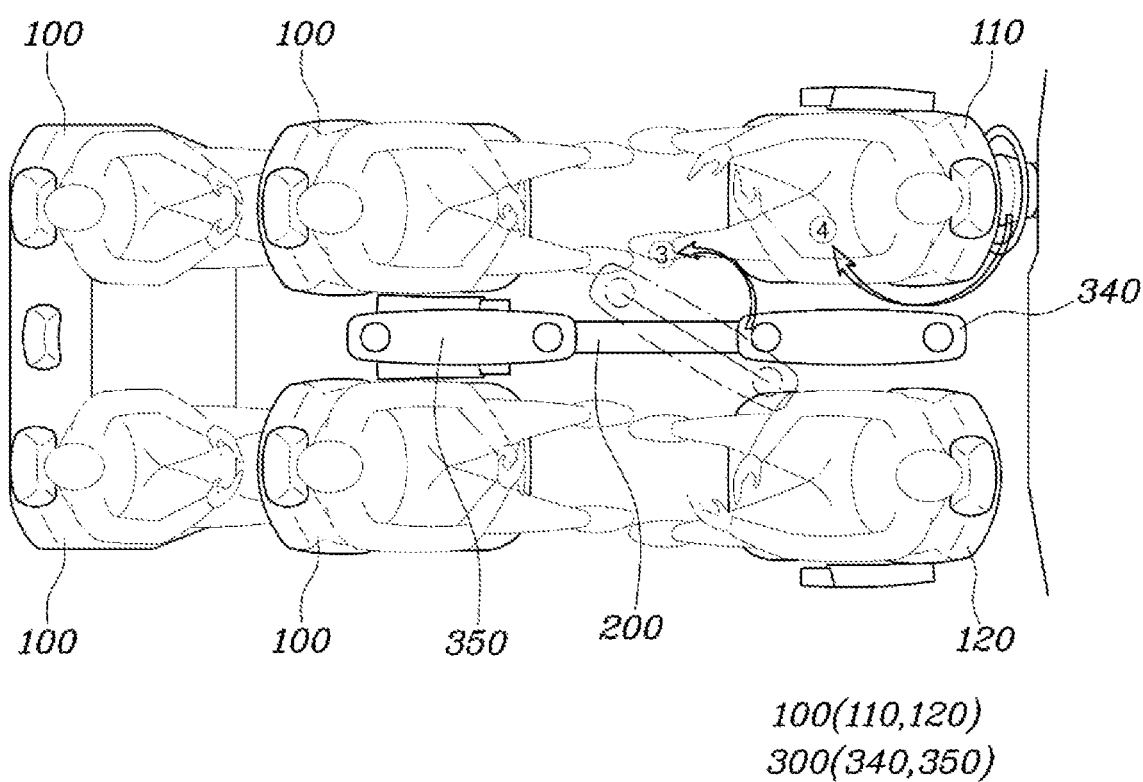
FIG. 3 is a view exemplarily illustrating a state in which a driver's seat is rotatable in the autonomous vehicle according to an exemplary embodiment of the present invention.
Figure 4:
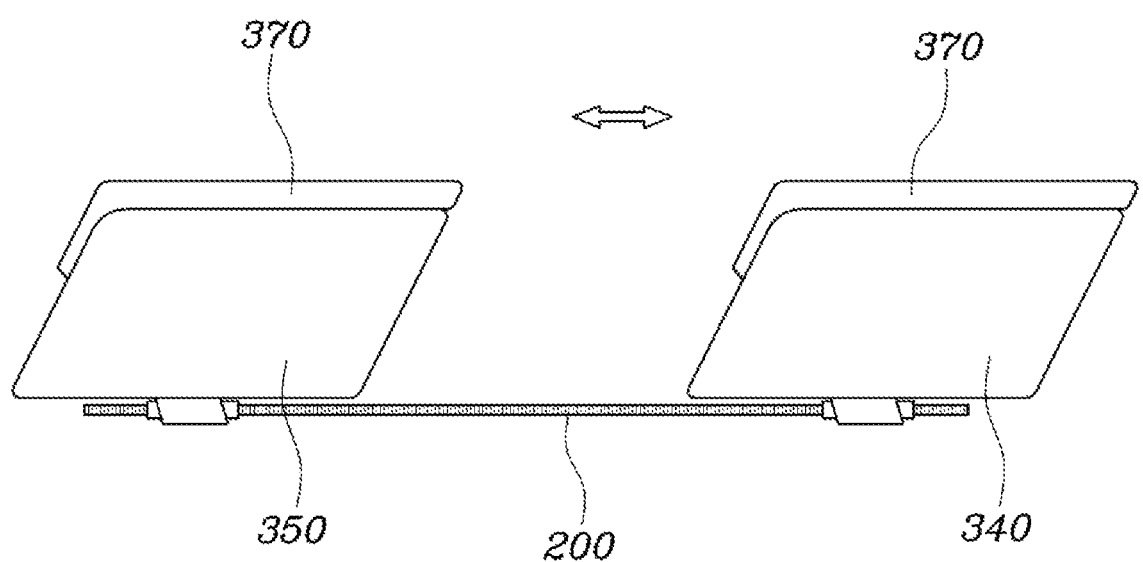
FIG. 4 is a view exemplarily illustrating a console device and a console device rail in the autonomous vehicle according to an exemplary embodiment of the present invention.
Figure 5:
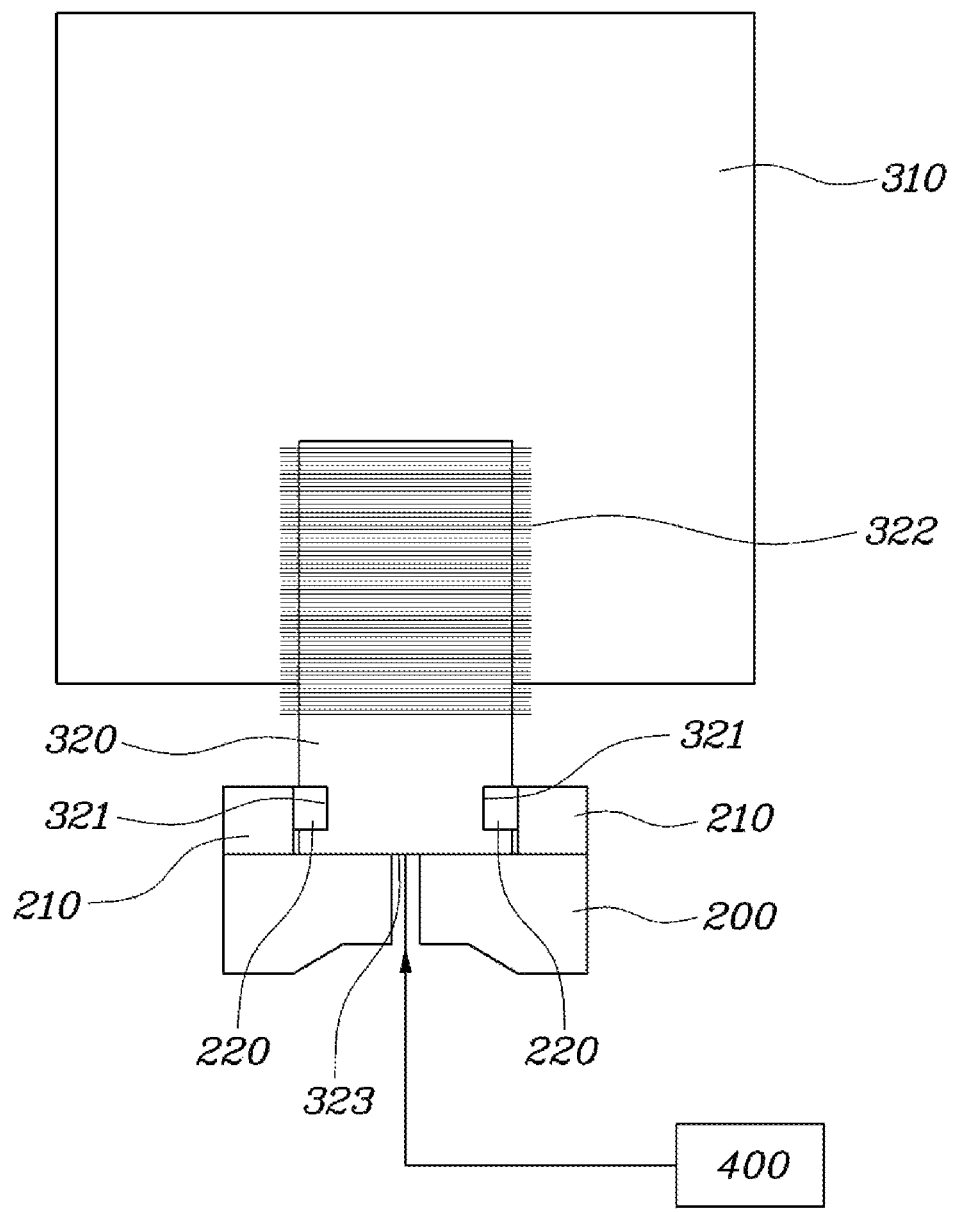
FIG. 5 is a detailed view exemplarily illustrating a structure of the console device and the console device rail in the autonomous vehicle according to an exemplary embodiment of the present invention.
Figure 6:
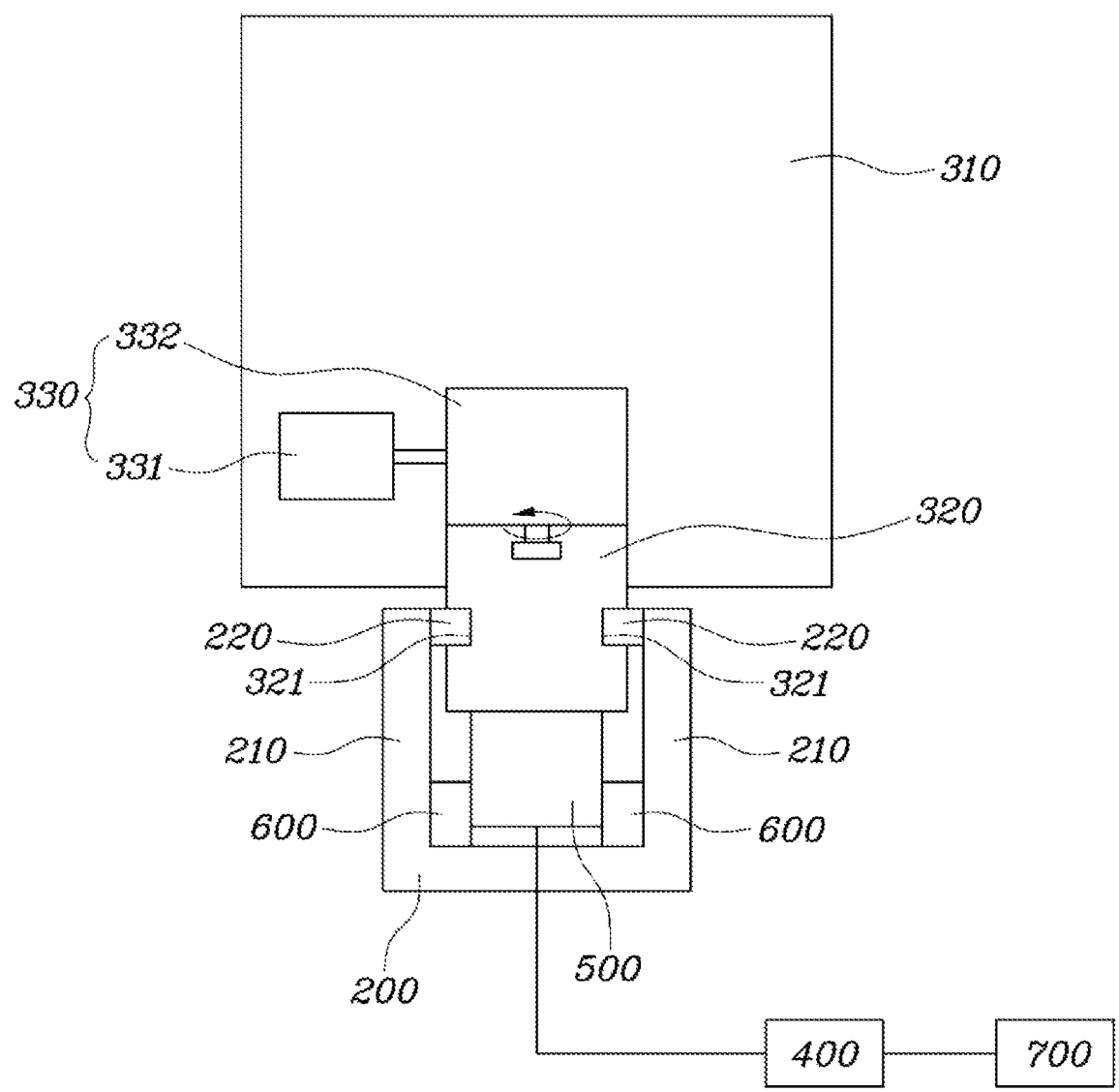
FIG. 6 is a detailed view exemplarily illustrating a structure of a console device and a console device rail in an autonomous vehicle according to various exemplary embodiments of the present invention.
Figure 7:
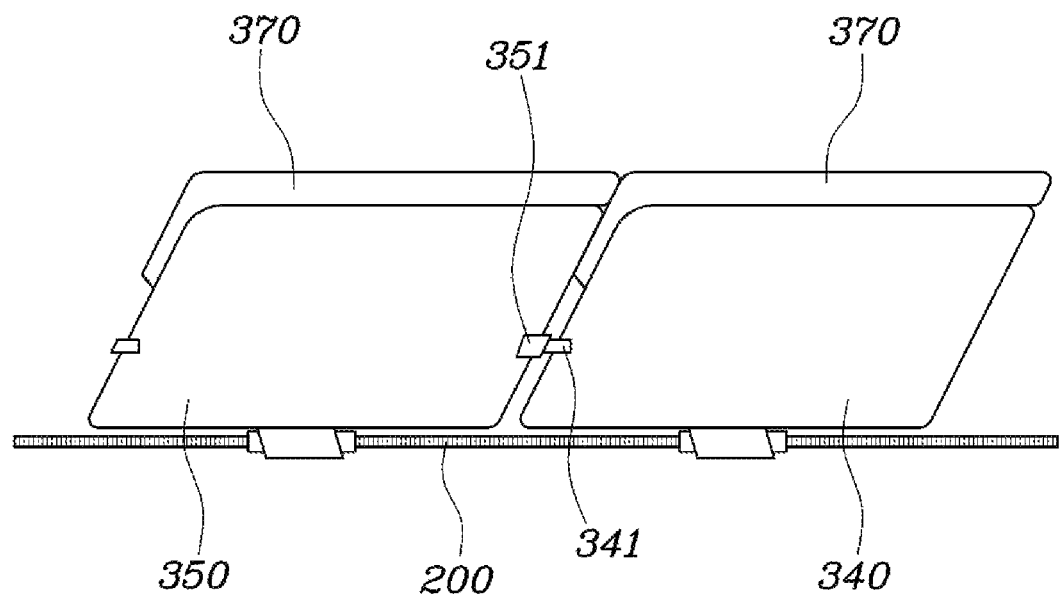
FIG. 7 is a view exemplarily illustrating a combination of a first console device and a second console device in an autonomous vehicle according to an exemplary embodiment of the present invention.
Figure 8:
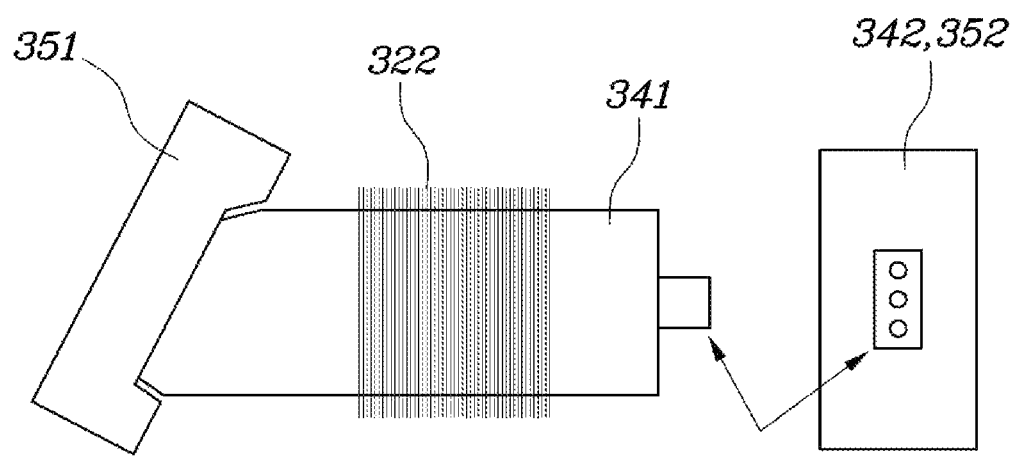
FIG. 8 is a view exemplarily illustrating a structure of a first coupling portion and a second coupling portion in the autonomous driving vehicle according to an exemplary embodiment of the present invention.
Figure 9:
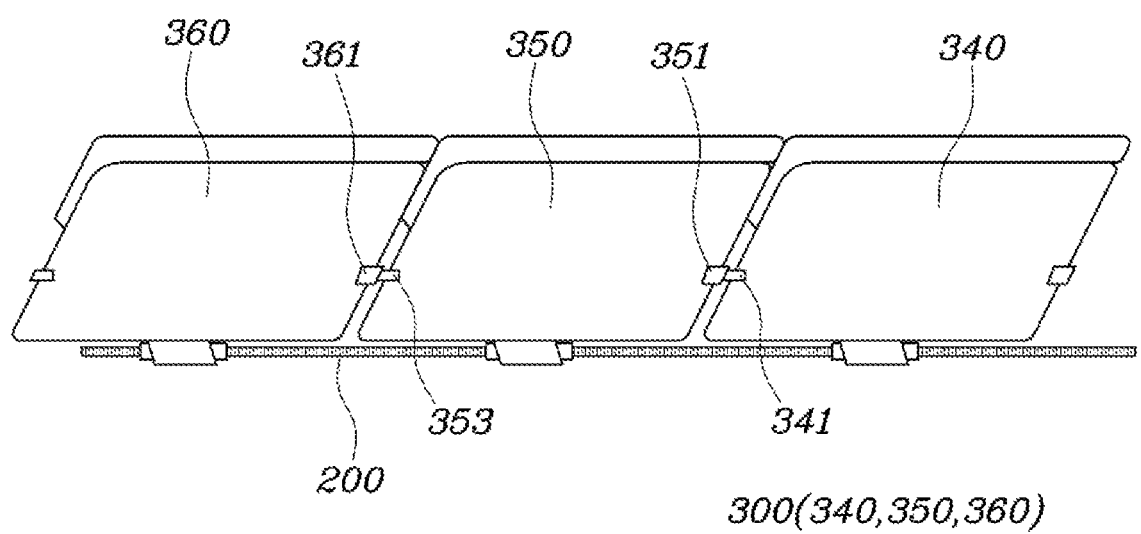
FIG. 9 is a view exemplarily illustrating a state in which three console devices are combined in an autonomous vehicle according to an exemplary embodiment of the present invention.
Figure 10:
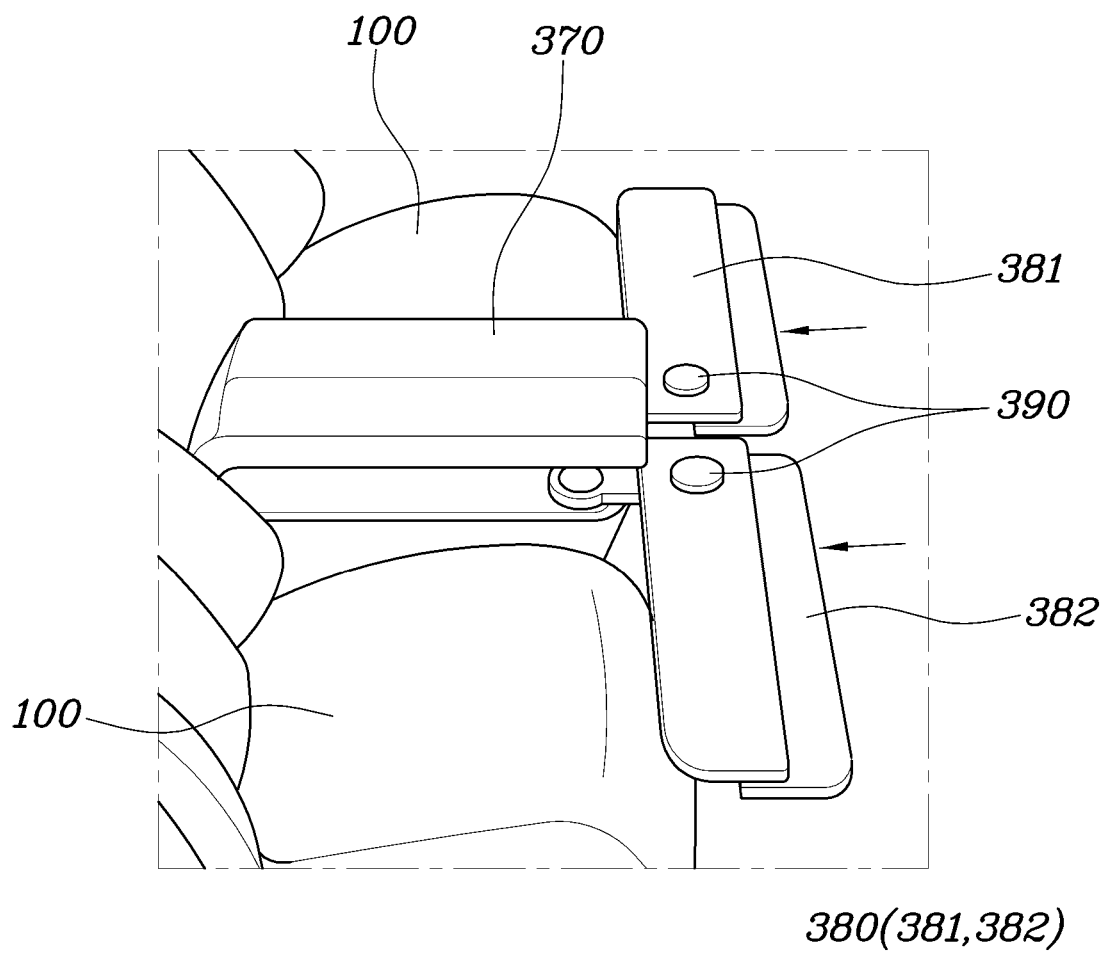
FIG. 10 is a view exemplarily illustrating a state in which a table is deployed in the console device of an autonomous vehicle according to an exemplary embodiment of the present invention.
Figure 11:
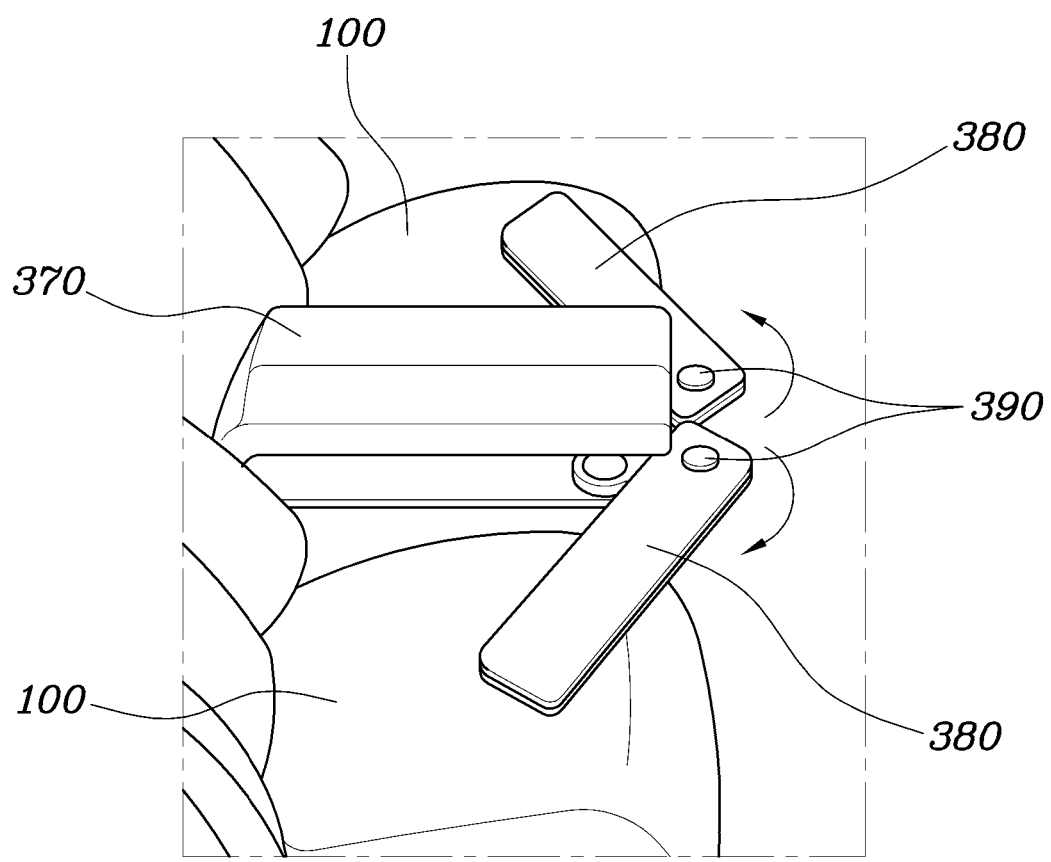
FIG. 11 is a view exemplarily illustrating a state in which a table is accommodated in the console device of an autonomous vehicle according to an exemplary embodiment of the present invention.

FIG. 1 is a view exemplarily illustrating an interior of an autonomous vehicle according to an exemplary embodiment of the present invention; FIG. 2 is a view exemplarily illustrating a state in which a passenger's seat is rotatable in the autonomous vehicle according to an exemplary embodiment of the present invention; FIG. 3 is a view exemplarily illustrating a state in which a driver's seat is rotatable in the autonomous vehicle according to an exemplary embodiment of the present invention; FIG. 4 is a view exemplarily illustrating a console device and a console device rail in the autonomous vehicle according to an exemplary embodiment of the present invention; FIG. 5 is a detailed view exemplarily illustrating a structure of the console device and the console device rail in the autonomous vehicle according to an exemplary embodiment of the present invention; FIG. 6 is a detailed view exemplarily illustrating a structure of a console device and a console device rail in an autonomous vehicle according to various exemplary embodiments of the present invention; FIG. 7 is a view exemplarily illustrating a combination of a first console device and a second console device in an autonomous vehicle according to an exemplary embodiment of the present invention; FIG. 8 is a view exemplarily illustrating a structure of a first coupling portion and a second coupling portion in the autonomous driving vehicle according to an exemplary embodiment of the present invention; FIG. 9 is a view exemplarily illustrating a state in which three console devices are combined in an autonomous vehicle according to an exemplary embodiment of the present invention; FIG. 10 is a view exemplarily illustrating a state in which a table is deployed in the console device of an autonomous vehicle according to an exemplary embodiment of the present invention; and FIG. 11 is a view exemplarily illustrating a state in which a table is accommodated in the console device of an autonomous vehicle according to an exemplary embodiment of the present invention.

Referring to FIGS. 1 to 11, the autonomous vehicle includes a plurality of seats 100, a console device rail 200, and a console device 300, and may further include one or more of a power supply 400, a motor 500, a wheel 600, and a controller 700.

The seats 100 may be provided to be rotatable about a vertical axis on a vehicle floor. In an exemplary embodiment of the present invention, the seats 100 may include a driver's seat 110 and a passenger's seat 120, which are provided in a first row, and other seats provided in second and third rows.

The console device rail 200 may be provided between the plurality of seats 100 and extend in the longitudinal direction thereof. The console device rail 200 may include extensions 210 extending upwards from an upper surface thereof and protrusions 220 protruding from the end portions of the extensions 210 as illustrated in FIG. 5 and FIG. 6.

Here, the protrusions 220 may be caught by grooves 321 formed in the console body moving portion 320, so that the console device 300 may slide without being derailed from the console device rail 200.

According to embodiments, the extensions 210 extend upwards from both sides of the upper surface of the console device rail 200 as shown in FIG. 5, and the protrusions 220 may protrude to face each other at the end portions of both extensions 210. Furthermore, the grooves formed in the console body moving portion 320 may be formed to have a predetermined depth in both sides of the moving portion at the position spaced apart a predetermined distance from a lower surface of the moving portion. However, the shape of the above-described extension 210, the protrusion 220, and the groove 321 is merely an example, and other shapes may be possible when the shape enables the console device 300 to slide without being detailed from the console device rail 200.

The console device 300 is mounted on the console device rail 200 and slides between the seats 100 along the console device rail 200. The console device is also mounted on the console device rail 200 through a rotation shaft so that the console device may be rotated about the rotation shaft relative to the console device rail 200.

The power supply 400 is configured to supply power to the console device 300, and in various exemplary embodiments of the present invention, may be a battery mounted in a vehicle.

In the autonomous vehicle according to the exemplary embodiment of the present invention including the above-described configuration, as illustrated in FIG. 2 and FIG. 3, the console device 300 slides along and is rotated on the console device rail 200 as the seat 100 rotates, so that the interference between the seat 100 and the console device 300 is avoided, allowing the seat 100 to be easily rotated.

Hereinafter, a console device and a console device rail for an autonomous vehicle according to an exemplary embodiment of the present invention will be described in detail with reference to FIG. 5 and FIG. 6.

Referring to FIG. 5, the console device 300 includes a console body 310 having an accommodating space, and a console body moving portion 320 for moving the console body 310.

In detail, the console body moving portion 320 may be connected to the console body 310 to fix or rotate the console body 310. Furthermore, the console body moving portion 320 may be accommodated on the console device rail 200 such that the moving portion can slide along the console device rail 200 to horizontally move the console body 310 along the console device rail 200. In embodiments, the cross section of the console body moving portion 320 is a circular cross section so that the moving portion may be rotated relative to the console device rail 200 while sliding along the console device rail 200.

The console body moving portion 320 may be provided with a groove 321 into which the protrusion 220 of the console device rail 200 may be inserted. In other words, as illustrated in FIG. 5, the bottom surface of the console body moving portion 320 is accommodated on the upper surface of the console device rail 200 with the protrusions 220 of the console device rail 200 caught in the grooves 321 of the console body moving portion 320, so that the console body moving portion 320 can slide along the console device rail 200 without being derailed therefrom.

On the other hand, the console body moving unit 320 may include a magnetic body, a coil 322 wound around the external peripheral surface thereof, and a power inlet 323 at a lower side thereof. Here, the power inlet 323 may receive power from the power supply 400. Furthermore, according to an exemplary embodiment of the present invention, the console device 300 may further include a switch to determine whether power is supplied from the power supply 400. Accordingly, when the switch is turned on, the power supply 400 may supply power to the console device 300 through the power inlet 323. When the switch is turned off, the power supply 400 shuts off a supply of power to the console device 300.

Meanwhile, when power is input to the power inlet 323, the console body moving unit 320 may be magnetized by the coil 322 wound around the external circumferential surface of the console body moving unit 320, and thus the console body moving unit may be fixed to the console device rail 200.

On the other hand, when a supply of power to the power inlet 323 is shut off, the console body moving portion 320 loses its magnetism so that the fixation of the console body moving portion to the console device 300 is released, allowing the console device 300 to slide along the console device rail 200 and to be rotated relative to the console device rail 200.

In other words, upon determining whether to supply power from the power supply 400 with the switch according to the exemplary embodiment of the present invention, when the seat 100 is to be rotated, the switch is turned off to shut off the input of the power to the power inlet 323 such that the console body moving unit 320 loses the magnetism so that the console device 300 can slide along the console device rail, and can rotate the seat 100 while rotating the console device at a certain angle relative to the console device rail 200. Furthermore, when the rotation of the seat 100 is completed, the console device 300 slides along the console device rail 200 and rotated relative to an angle to return the console device 300 to its original position. Then the switch is turned on to supply power to the power inlet 323 to magnetize the console body moving portion 320 so that the console device 300 may be fixed to the console device rail 200.

Meanwhile, referring to FIG. 6, in the autonomous vehicle according to various exemplary embodiments of the present invention, the console device 300 may include a console body 310 having an accommodation space, a console body moving unit 320 for moving the console body 310, and a rotating portion 330 for rotating the console body 310. A motor 500 and a wheel 600 may be provided inside the console device rail 200.

The rotating portion 330 is connected to the console body 310 to rotate the console body 310. Furthermore, the rotating portion 330 may be coupled to the console body moving portion 320 through a rotating hinge so that only the console body 310 may be relatively rotated while the console body moving unit 320 is fixed.

According to an exemplary embodiment of the present invention, the rotating portion 320 may include a rotating actuator 331 and a gear box 332. Here, the rotating actuator 331 may be a motor in an exemplary embodiment of the present invention. Furthermore, the gear box 332 may include a plurality of gears, which change the direction of a rotation force transmitted from the rotating actuator 331 through a combination of gear coupling to allow relative rotation of the console body 310.

The console body moving portion 320 may be positioned below and connected to the rotating portion 330 to allow the console device 300 to slide without being derailed from the console device rail 200.

The motor 500 may be located inside the console device rail 200 and the upper portion thereof may be connected to the console body moving portion 320. The motor is also connected to the wheel 600 provided on the upper surface of the console device rail. That is, when the wheel 600 slides along the console device rail 200 as the motor 500 is driven, the console device 300 may slide along the console device rail 200.

Illustrating the sliding of the console device 300 along the console device rail 200 as the motor 500 is driven, in an exemplary embodiment in which a rotor of the motor 500 is formed integrally with a ball nut and a lead screw is located inside the ball nut, when the motor 500 is driven, the ball nut is rotated along the lead screw so that the console device 300 can slide along the console device rail 200.

Although not illustrated in detail in the drawings, the motor 500 and the rotating actuator 331 located inside the console device rail 200 may be driven by receiving power from the power supply 400. Furthermore, as described above, whether to supply power from the power supply 400 may be determined according to an operation of a switch.

In other words, when the seat 100 is to be rotated, the switch may be turned on to drive the motor 500 and the rotating actuator 331 to slide and rotate the console device 300 for easily rotating the seat 100.

Meanwhile, the console device rail 200 may include extensions 210 extending upwards from the upper surface thereof, and protrusions 220 protruding from the end portions of the extensions 210, wherein the console body moving portion 320 has grooves 321 into which the protrusions 220 of the console device rail 200 are inserted. In other words, as illustrated in FIG. 6, the protrusions 220 of the console body rail 200 are caught in the grooves formed in the console body moving portion 320, so that when the wheel 600 is moved along the console device rail 200 as the motor 500 is driven, the console device 300 may slide without being derailed from the console device rail 200.

Referring to FIGS. 7 and 9, the console device 300 may include a first console device 340 and a second console device 350, and in an exemplary embodiment of the present invention, may further include a third console device 360. Here, the first console device 340 may be provided on the outside with a first coupling portion 341 for coupling with the second console device 350, and the second console device 350 may be provided on the outside with a second coupling portion 351 for coupling with the first coupling portion 341. Furthermore, the second console device 350 may be provided with a third coupling portion 353 for coupling with the third console device 360, and the third console device 360 may be provided with a fourth coupling portion 361 for coupling with the third coupling portion 353.

The first coupling portion 341 and the second coupling portion 351 may be tapered at portions that are abutted against each other when coupled to each other. According to an exemplary embodiment of the present invention, the first coupling portion 341 and the second coupling portion 351 may be coupled such that the first coupling portion 341 is inserted into a groove formed in the second coupling portion 351. Here, the first coupling portion 341 and the second coupling portion 351 are tapered at portions that are abutted against each other when coupled to each other, to guide the coupling of the first coupling portion 341 and the second coupling portion 351, providing more easy coupling between the first coupling portion 341 and the second coupling portion 351.

On the other hand, the first coupling portion 341 may include a magnetic body, a coil 322 wound around the external peripheral surface thereof, and a sensor for measuring the distance from the second console device 350. In the instant case, the sensor is connected to the controller 700 to be described later to transmit the measured distance information to the controller 700, which determines whether power is supplied to the first coupling portion 341 based on the transferred information.

The controller 700 may control whether power is supplied to the first coupling portion 341 according to the distance between the first coupling portion 341 and the second coupling portion 351. When the distance between the first coupling portion 341 and the second coupling portion 351 is less than or equal to a predetermined distance, the controller 700 causes power to be supplied to the first coupling portion 341 so that the first coupling portion 341 may be magnetized to be coupled to the second coupling portion 351. Furthermore, when the distance between the first coupling portion 341 and the second coupling portion 351 is more than or equal to the predetermined distance, the controller 700 stops the supply of power to the motor 500, stopping the movement of the console device 300 along the console device rail 200.

In other words, when the distance between the first coupling portion 341 and the second coupling portion 351 is less than or equal to the predetermined distance, the controller 700 causes power to the first coupling portion 341 to magnetize the first coupling portion 341 so that a flow of magnetic energy occur to the first coupling portion 341 and the second coupling portion 351 to enable the first coupling portion 341 and the second coupling portion 351 to be coupled by magnetic force.

According to an exemplary embodiment of the present invention, the first coupling portion 341 and the second coupling portion 351 may be internally provided with a first data connection portion 342 and a second data connection portion 352. When the first coupling portion 341 and the second coupling portion 351 are coupled to each other, the first data connection portion 342 and the second data connection portion 352 are connected to each other so that power or a data signal may be transmitted between the first console device 340 and the second console device 350.

Meanwhile, even when there are three console devices as illustrated in FIG. 9, the first console device 340, the second console device 350, and the third console device 360 are mutually connected in the same manner as described above. That is, the first coupling portion 341 is coupled to the second coupling portion 351, and the third coupling portion 353 is coupled to the fourth coupling portion 361, so that three console devices may be combined into one. In the instant case, the plurality of console devices coupled to each other may slide along the console device rail 200 in a coupled state. Furthermore, when the power supplied to each coupling portion is shut off through a switch or the like, each coupling portion may lose its magnetic force and the coupled console devices may be decoupled.

Figure 12:
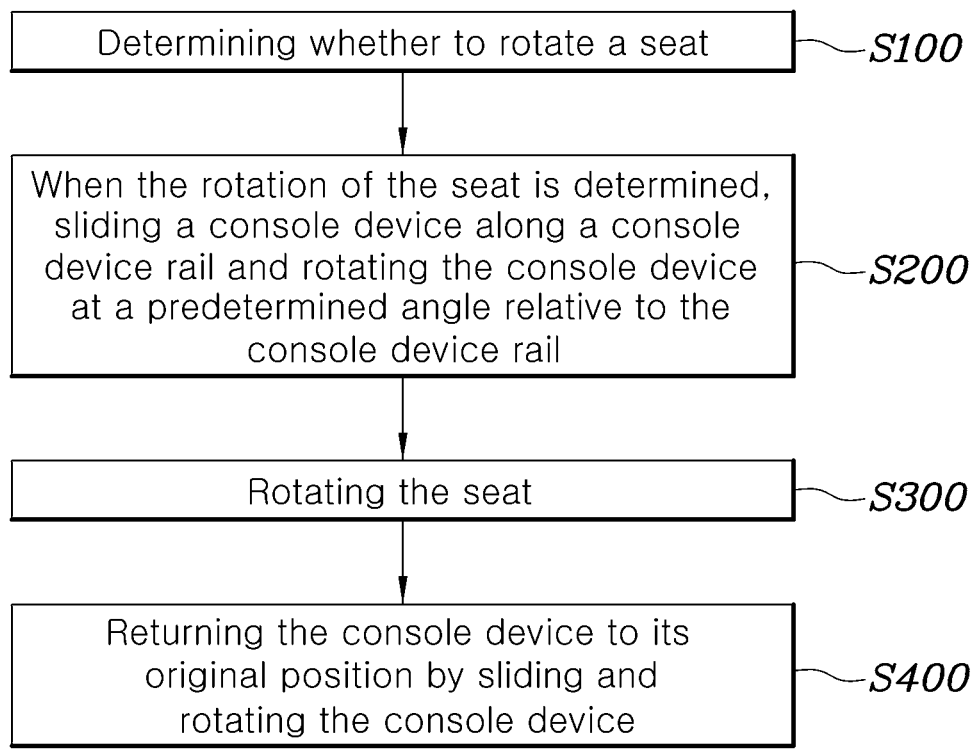
FIG. 12 is a flowchart illustrating a method of rotating a seat in an autonomous vehicle according to an exemplary embodiment of the present invention.

Referring to FIG. 11 and FIG. 12, in the autonomous vehicle according to an exemplary embodiment of the present invention, the console device 300 may further include a cover 370 located above the console body 310, and a table 380 accommodated between the cover 370 and the console body 310. Furthermore, a hinge 390 may be provided on the upper surface of the console body 310 to allow the table 380 to rotate.

The table 380 may include an upper table 381 and a lower table 382. Explaining the unfolding of the table with reference to FIG. 11, after rotating the table 380 through the hinge 390 to unload the table 380 from the accommodation space, the upper table 381 may be slid to be unfolded below the upper table 381.

On the other hand, explaining the loading of the table with reference to FIG. 12, the lower table 381 may be slid to move under the upper table 381 to overlap the upper table 381, and the table 380 may be rotated through the hinge 390 to be accommodated in the accommodation space between the console body 310 and the cover 370.

FIG. 12 is a flowchart illustrating a method of rotating a seat in an autonomous vehicle according to an exemplary embodiment of the present invention. Referring to FIG. 12, the method of rotating a seat may include determines whether to rotate the seat (S100), when the rotation of the seat is determined, sliding a console device along a console device rail and rotating the console device at a predetermined angle relative to the console device rail (S200), rotating the seat (S300), and sliding and rotating the console device in the console device to its original position (S400).

Here, in the determining whether to rotate the seat, it is determined whether the seat to be rotated is the driver's seat or the passenger's seat, and when the seat to be rotated is the driver's seat, it is determined whether a vehicle is stopped or parked, and only when the vehicle is stopped or parked, the seat may be rotated.

Referring to FIG. 2, the passenger's seat may be rotated as follows. First, after the console device 300 slides rearward from the console device rail 200, the passenger's seat may be rotated inward while the console device 300 is rotated at a predetermined angle in the driver's seat direction thereof. When the rotation of the passenger's seat is completed, the console device 300 may be rotated at a predetermined angle in the opposite direction and slid forward to return to the original position.

Referring to FIG. 3, the driver's seat may be rotated as follows. First, after it is determined whether a vehicle is stopped or parked, and only when the vehicle is stopped or parked, the console device 300 may be slid rearward from the console device rail 200, and the driver's seat may be rotated inward while the console device 300 is rotated at a predetermined angle in the passenger's seat direction thereof. When the rotation of the driver's seat is completed, the console device 300 may be rotated at a predetermined angle in the opposite direction and slid forward to return to the original position.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle comprising:
    a plurality of seats rotatably mounted on a vehicle floor of the vehicle;
    a console device rail mounted between the plurality of seats and extending in a longitudinal direction of the vehicle; and
    a console device mounted on the console device rail and configured for sliding between the plurality of seats along the console device rail, the console device mounted on the console device rail via a rotation shaft to be rotatable about the rotation shaft relative to the console device rail,
    wherein when the console device is slid along and rotated relative to the console device rail during rotation of at least one of the plurality of seats, an interference by the plurality of seats and the console device is prevented.

2. The vehicle according to claim 1, wherein the console device includes:
    a console body having an accommodation space; and
    a console body moving portion connected to the console body to fix or rotate the console body, a lower surface of the console body moving portion being accommodated on an upper surface of the console device rail and configured to be slid along the console device rail to move the console body.

3. The vehicle according to claim 2,
    wherein the console device rail includes an extension extending upwards from an upper surface of the console device rail and a protrusion protruding from an end portion of the extension,
    wherein the console body moving portion is provided with a groove into which the protrusion of the console device rail is inserted, and
    wherein the lower surface of the console body moving portion is accommodated on the upper surface of the console device rail such that the protrusion of the console device rail is caught in the groove formed in the console body moving portion, so that the console body moving portion is configured to be slid without being derailed from the console device rail.

4. The vehicle according to claim 2, further including a power supply supplying power to the console device.

5. The vehicle according to claim 4,
    wherein the console body moving portion includes a magnetic body, a coil wound around an external circumferential surface thereof, and a power inlet provided at a lower end portion of the console body moving portion, and
    wherein when the power is input to the power inlet, the console body moving portion is magnetized by the coil to be fixed to the console device rail.

6. The vehicle according to claim 5, wherein when the power to the power inlet is shut off, the console body moving portion loses magnetism thereof to release the fixation to the console device rail so that the console device slides along and rotates relative to the console device rail.

7. The vehicle according to claim 1, wherein the console device includes:
    a console body having an accommodation space;
    a rotating portion connected to the console body to rotate the console body; and
    a console body moving portion positioned below and connected to the rotating portion to allow the console device to slide without being derailed from the console device rail.

8. The vehicle according to claim 7, further including:
    a motor located inside the console device rail and connected to the console body moving portion; and
    a wheel mounted on an upper surface of the console device rail,
    wherein when the wheel slides along the console device rail as the motor is driven, the console device is configured to slide along the console device rail.

9. The vehicle according to claim 8,
    wherein the console device rail includes:
        an extension extending upwards from the upper surface of the console device rail; and
        a protrusion protruding from an end portion of the extension,
    wherein the console body moving portion is provided with a groove into which the protrusion of the console device rail is inserted, and
    wherein the protrusion of the console device rail is caught by the groove formed in the console body moving portion, so that when the wheel is moved along the console device rail as the motor is driven, the console device is configured to slide without being derailed from the console device rail.

10. The vehicle according to claim 4,
    wherein the console device includes a first console device and a second console device, and
    wherein the first console device is provided on the outside thereof with a first coupling portion for coupling with the second console device, and the second console device is provided on the outside thereof with a second coupling portion for coupling with the first coupling portion.

11. The vehicle according to claim 10, wherein the first coupling portion and the second coupling portion are tapered at portions that are abutted against each other when coupled together.

12. The vehicle according to claim 10, wherein the first coupling portion includes a magnetic body, a coil wound around an external circumferential surface thereof, and a sensor configured to measure a distance from the second console device to the first coupling portion.

13. The vehicle according to claim 12, further including a controller configured to determine whether to supply the power to the first coupling portion depending on the distance between the first coupling portion and the second coupling portion.

14. The vehicle according to claim 13, wherein when the distance between the first coupling portion and the second coupling portion is less than or equal to a predetermined distance, the controller is configured to supply the power to the first coupling portion to magnetize the first coupling portion to be coupled to the second coupling portion.

15. The vehicle according to claim 14, wherein when the distance between the first coupling portion and the second coupling portion are more than the predetermined distance, the controller is configured to stop the supply of the power to a motor to stop the console device from moving along the console device rail.

16. The vehicle according to claim 10,
wherein the first coupling portion and the second coupling portion are internally provided with a first data connection portion and a second data connection portion, and
wherein when the first coupling portion and the second coupling portion are coupled to each other, the first data connection portion and the second data connection portion are connected to each other so that power or data signal is transmitted between the first console device and the second console device.

17. The vehicle according to claim 2,
wherein the console device further includes:
 a cover located above the console body; and
 a table accommodated between the console body and the cover, and
wherein the console body is provided on an upper surface thereof with a hinge for the table to rotate about the hinge.

18. The vehicle according to claim 7,
wherein the console device further includes:
 a cover located above the console body; and
 a table accommodated between the console body and the cover, and
wherein the console body is provided on an upper surface thereof with a hinge for the table to rotate about the hinge.

19. The vehicle according to claim 17,
wherein the table includes an upper table and a lower table, and
wherein the lower table is configured to slide to overlap a lower side of the upper table, and then is rotated through the hinge to be accommodated in the accommodation space between the console body and the cover.

20. The vehicle according to claim 18,
wherein the table includes an upper table and a lower table, and
wherein the lower table is configured to slide to overlap a lower side of the upper table, and then is rotated through the hinge to be accommodated in the accommodation space between the console body and the cover.

21. A method of rotating a seat in a vehicle, the method comprising:
determining whether to rotate the seat;
when the seat is determined to be rotated, sliding a console device along a console device rail and rotating the console device at a predetermined angle relative to the console device rail;
rotating the seat; and
returning the console device to an original position of the console device by sliding and rotating the console device.

22. The method according to claim 21, wherein the determining whether to rotate the seat includes:
determining whether the seat to be rotated is a driver's seat or a passenger's seat;
when the seat to be rotated is the driver's seat, determining whether the vehicle is stopped or parked; and
when the vehicle is stopped or parked, allowing the seat to be rotatable.

* * * * *